3,232,774
REFRACTORY COMPOSITION AND METHOD
OF PRODUCING SAME
Nelson H. Kehl, Hagerstown, Md., assignor to Martin
Marietta Corporation, a corporation of Maryland
No Drawing. Filed Dec. 11, 1962, Ser. No. 243,718
11 Claims. (Cl. 106—58)

This invention relates to refractory compositions. More particularly, it relates to magnesia and magnesia-chrome refractories useful in the repair of refractory furnace linings. Still more particularly, it relates to so-called gunning mixes, i.e., mixtures of refractory materials which are suitable for spraying from a gun such as a nozzle mix air gun and to a process of bonding dead-burned magnesite.

The present invention contemplates a mixture of refractory magnesia vehicle with several ingredients wherein the desirable properties for the purpose of use as gunning mixes are attributable to the mixed or combined relationship of the ingredients and to the method of producing a refractory from said mixture of ingredients. The magnesia gunning mixes of this invention are characterized by a fast wettability to a fluid mixture in a gun, by an ability to adhere to a, for example, vertical wall while wet and by fast setting to a nonflowing mixture when emplaced by impact of a stream from a gun on the wall and a rapid set to a non-slumping mass.

Granular magnesia and/or chrome refractory materials have been commonly used in metallurgical furnaces. Such refractory materials alone do not produce satisfactory compositions when wet with water because the granular refractory particles, for example, dead-burned magnesite, are lacking in adhesion, plasticity, and other properties. It is common practice to chemically bond such refractories with a water soluble binder such as sodium silicate. However, while sodium silicate imparts good green strength to such compositions, sodium silicate promotes hydration and imparts to, for example, ramming mixes, too great a shrinkage. Mixes exhibiting appreciable shrinkage generally fail after firing to present a continuous impermeable base.

It has also been common practice in ramming mixes and the like to add magnesium sulfate. Use of magnesium salts is predicated upon a reaction between the magnesite and the sulfate to form an oxy-sulfate cement when heated. Such a cement forms a strong bonding material. However, the reaction is such that it will not take place in the time and under the conditions of emplacing a gunning mix.

To make quick localized repairs and to arrest the deterioration of, for example, a furnace slag line, refractory compositions known as gunning mixes are deposited on hot or cold walls of a lined furnace. These gunning mix compositions, to be effective, must have refractory characteristics approaching those required for the lining.

Gunning mixes to be useful must possess among other properties, quick wettability, water tolerance, adhesiveness, and minimum of shrinkage when dried. Lack of adhesiveness when the material is projected against a hot or cold wall has been the most frequent deficiency of refractory mixes, particularly when attempts were made to adapt ramming or tamping mixes to the gunning operation. Formualtion of magnesia gunning mixes has been further complicated because of the lack of natural cohesiveness of granules of refractory vehicles and because attempts to improve a specific property frequently results in accentuating defects in other properties and even the development of new and undesirable properties.

If the failure of the gunning mix is due to a lack of adhesiveness, this shortcoming shows itself by the complete or partial loss of large quantities of refractory material due to the fact that the material thrown on a furnace wall slumps and falls off as the thickness of the emplaced composition increases. In the past, when attempts were made to overcome this deficiency by increasing the quantity of the binder in a refractory mix, the refractory has shown itself to have other serious disadvantages. Appreciable quantities of commonly used binders can lessen the refractoriness of a composition to an undesirable degree, can lower the strength of the material after heating or firing and can increase the clogging difficulties experienced with spray guns.

When an attempt is made to improve the gunning mixes by adding an amount of an agent such as starch, ball clay, bentonite, etc., to refractory vehicles sufficient to have a plasticizing effect, it has been found that the resultant structure is weak and lacks refractoriness to an undesirable degree due to the presence of excesive impurities added as part of the plasticizing agent.

Further important and related problems encountered with prior materials are the wettability of the mixtures and the water tolerance. In many attempts to decrease the loss of materials due to lack of adhesion or "rebound," the amount of water added in the spray nozzle was increased. Magnesia refractories and/or chrome ore mixtures, etc., exhibit limited absorption or adsorption of water and the mixtures with increased water content when deposited on, for example, a vertical wall of a furnace, tended to be so soupy as to run and not to hold their shape. Wetting of the binder to activate it in the short time between the mixing of the dry refracory composition with water and the deposition of the mixture on a wall is at least a part of this problem. Some materials such as starch and gums are excellent binders if sufficient time is provided for wetting, dissolving, or dispersing. In the short time between wetting and deposit of the refractory gunning mixes, the slow wetting binders are a hinderance since they act almost like an inert granule.

In accordance with the present invention, adhesion, wettability, and water tolerance, which are normally absent, may be imparted to refractory compositions without deleteriously affecting the high temperature refractoriness. The improved refractory gunning mixes of this invention comprise refractory material, magnesium sulfate binder, and lime. In adapting the refactory materials to specific uses, the refractory may contain a chromium bearing material such as chrome ore, calcined chrome ore crushed to desired size, or chromium binder materail.

In a typical gunning mix, the bulk of the refractory material, or at least a large proportion, is magnesia. The term "magnesia" as used herein and in the claims means highly magnesium refractory vehicle of any kind, and particularly to indicate not only calcined, i.e., deadburned magnesia, dead-burned dolomite, etc., but also fused magnesia.

A typical refractory material is dead-burned magnesia clinker comminuted to a relatively course mesh as for instance to a particle size which will pass a ⅛ inch screen and be retained on a number 30 U.S. Standard screen. The magnesite which is employed can be any high purity dead-burned magnesia obtained by calcining high grade natural ores such as magnesite or brucite, or it can be obtained by calcining any magnesium compound which yields magnesium oxide upon calcination of, for example, relatively pure magnesium hydroxide or magnesium carbonate at temperatures usually ranging from 2700°–3500° F. Dead-burned dolomite may be substituted for portions of the magnesite, particularly for magnesite particles falling in the coarser size ranges.

The magnesite is preferably employed in the dead-burned state. Chemical analysis of typical magnesias shows various components in the following ranges:

| Material: | Ranges, percent |
|---|---|
| $SiO_2$ | 2.5–8 |
| $Fe_2O_3$ | 1.0–6 |
| $Al_2O_3$ | 0.5–3 |
| CaO | 1.5–6 |
| MgO | 80–95 |

When making up batches of gunning mixes, the grain or particle size of the aggregates can, if desired, be selected primarily because of area, method of emplacement, and packing characteristics. Representative screen sizing of the particles may be as follows, the sizes being U.S. Standard screen sizes.

Screen sizings:

| | (1) | (2) | (3) | (4) |
|---|---|---|---|---|
| Percent pass: | | | | |
| ¼" | 100 | 100 | | |
| #4 | 94 | 97 | | |
| #8 | 64 | 76 | 99 | 100 |
| #16 | 51 | 56 | 81 | 90 |
| #30 | 49 | 41 | 56 | 65 |
| #100 | 36 | 23 | 32 | 27 |

Such products may be made by screening out various groups of particle sizes and then recombining them to obtain the desired particle size curve. As many as four or five different size products may be recombined to form a magnesia component of the gunning mixes. It is usually preferable to maintain in the magnesia component a content of 20% to 40% of material passing a 100 mesh screen. The sizings, shown as applicable to magnesia, may also be applied to chrome ore if that is a desired component of the gunning mix.

Chrome ores useful in refractory mixes vary widely in composition. A typical chrome ore useful for the purposes of this invention shows the following chemical analysis:

| | Percent |
|---|---|
| $SiO_2$ | 4.8 |
| FeO | 24.3 |
| $Al_2O_3$ | 16.9 |
| CaO | Traces |
| MgO | 11.0 |
| $Cr_2O_3$ | 42.7 |

Crome ore is useful in this invention in quantites up to 70% of the dry mix. When preparing gunning mixes containing chrome ore, the basic constituents, i.e., the mixture of magnesia and chrome ore generally have a chemical analysis falling in the following ranges:

| | Percent |
|---|---|
| $SiO_2$ | 3.0–8 |
| $Fe_2O_3$ | 3.0–15 |
| $Al_2O_3$ | 2.5–10 |
| CaO | 1.5–5 |
| MgO | 40–80 |
| $Cr_2O_3$ | 0.5–35 |

Chromium binder materials are to be distinguished from chrome ores which are complexes of oxides, silicates, etc., of chromium, aluminum, iron, magnesia, and the like. As binder, chromium compounds are used in quantities generally less than 3% by weight of the mix on a $Cr_2O_3$ basis. Chromium compounds useful as binders are, for example, chromic acid, chromium-containing salts, chromous sulfate, chromic sulfate, chromic halides, chromic-oxalate, chromates, and dichromates. Chromium salts, acting as binders, calculated as $Cr_2O_3$, may constitute up to 3% by weight of the dry mix.

With materials as aforementioned, there is added a binder in quantities varying from about 1.0% to about 5% by weight. Useful binders for the purposes of this invention are dehydrated magnesium sulfate, kieserite, and Epsom salts. Preferably, the magnesium sulfate is present in amounts in the range between about 1.0% and 2.25%.

To this mixture of refractory vehicle and binder is added lime in amounts constituting by weight between 0.5% and 7%, preferably between 1.25% and 2.5%. Useful equivalent materials are high calcium lime hydrate, dolomite lime hydrate, pulverized quicklime and the like. It has been pointed out hereinbefore that fast setting to a non-slumping mass is a primary requisite of gunning mixes. The reaction in the instant compositions is primarily between the lime and the magnesium sufate to form a weak, as measured by crushing tests, composition prior to firing, but one which is substantially hard and non-flowing almost immediately after deposition. This reaction is to be distinguished from the reaction which takes place between magnesia and magnesium sulfate. The magnesium sulfate reacts preferentially with the lime even in the presence of magnesia.

In preparing the gunning mix compositions according to the present invention, the primary refractory components can be mixed together and water added for immediate use or the dry mixture can be stored or shipped. It is preferred to grind each component separately and to mix the ground materials. If desired, when the gunning mixes are to contain chromium, the magnesia component and the chromium component can be ground together.

Dry gunning mix, when it is used, is delivered to a gun nozzle suspended or entrained in a moving air or gas stream. At the gun nozzle, the operator proportions the solids and water based upon the observed adherence to or "rebound" from the wall against which the stream of wetted solids is projected. Magnesia type gunning mixes hertofore have given a narrow range of about plus or minus 1% water for proper adherence, i.e., a range of, for example, 8–10% or 10–12% by weight of water. Utilizing the mixes of the instant invention, proper adherence generally may be attained over a range of water content of the wetted gunning mix of from about 8–16%.

A representative gunning mix for repair of magnesite furnace lining, prepared from comminuted periclase, was prepared from a magnesite of a particle size 100% of which passed through a ⅛ inch screen and about 75% of which was retained on a number 100 U.S. Standard screen.

This dead-burned magnesite possessed a particle size distribution meeting specifications for:

99% passing through a 6 mesh screen
45–60% passing through a 16 mesh screen
18–24% passing through a 100 mesh screen The magnesite material showed a chemical analysis of:

| | Percent |
|---|---|
| $SiO_2$ | 4.8 |
| $Fe_2O_3$ | 2.4 |
| $Al_2O_3$ | 1.3 |
| CaO | 4.0 |
| MgO | 87.5 |

The above specified magnesia material, uniformly blended with binders, may be mixed at the nozzle of a BRI gun with 8 to 15 parts by weight of water per 100 parts of dry mix composition. The stream of wetted solids, when jetted against a furnace lining, will adhere to the contact area, holds its shape, is hardened almost immediately, and is fired as the furnace is brought to operating temperature.

For comparative tests, results of which are summarized in Table I, refractory materials were prepared as follows:

A gunning composition was prepared from magnesia having the following composition.

Particle size:
Pass ⅛″ screen and retained on No. 16 screen _ 45
Pass No. 16 screen and retained on No. 30 screen _____ 16
Pass No. 30 screen _____ 35

The batch was split into portions providing a control sample of magnesite and secondary batches. Gunning mix batches indicated as Mixes A and B were prepared by adding 2% by weight of hydrated lime and of Epsom salts, respectively, to secondary magnesite batches. A gunning Mix C was prepared by adding 2% of hydrated lime and 2% of Epsom salts to a secondary magnesite batch.

Samples of Mixes A, B, and C were each mixed with 10% by weight of water and poured into a mold immediately after mixing so as to conduct standard penetration tests such as is described in ASTM manual, section C472-61. Results are shown in Table I.

TABLE I

| Minutes after mixing | Depth of penetration, mm. (40 mm. max.) | | |
|---|---|---|---|
| | Mix A | Mix B | Mix C |
| 0 | 40 | 35 | 10 |
| 2 | 40 | 30 | 9 |
| 4 | 40 | 30 | 10 |
| 8 | 40 | 20 | 6 |
| 12 | 40 | 20 | 3 |
| 16 | 40 | 20 | 4 |
| 20 | 40 | 17 | 3 |
| 28 | 40 | 12 | 3 |

This test shows the effect of binders upon the rate of set of a magnesite gun mix. The body containing only lime did not set up at all during the time of the test. The Epsom salts tended to set up during the twenty-eight minute test, but the lime-Epsom salts combination reacted quickly and was substantially hard immediately after pouring into the mold.

Additional Mixes D and E were prepared by adding to secondary magnesite batches 2% of ball clay and a combination of 2% of ball clay and 2% of Epsom salts respectively.

A 300 gram sample was withdrawn from each of Mixes A through E, inclusive, and made into a wetted mix by addition of 3% of water. The wetted solids were tamped into 2 inch Dietert cylinders. The cylinders were tested for crushing strength after oven drying. Results are shown in Table II:

TABLE II

| Mix | Binder | Dried crushing strength, p.s.i. |
|---|---|---|
| A | 2% hydrated lime | 144 |
| B | 2% Epsom salts | 1,006 |
| C | 2% Hydrated lime-2% Epsom salts | 196 |
| D | 2% ball clay | 289 |
| E | 2% ball clay-2% Epsom salts | 1,026 |

The traditional strong bond formed by Epsom salts with magnesite is evident in the second result. Lime alone imparted very little strength to the body, and the addition of the 2% Epsom salts to the 2% hydrated lime did not increase the strength significantly.

For the purposes of this invention, the magnesite component of the gunning mixes may be made up of particles chosen from a single size range or by a mixture of magnesite particles encompassing two or more different size ranges. Mixtures of magnesite particles chosen from several size ranges are present because they are believed to compact to a denser final product.

Components of complete gunning mixes may have the following limits by weight:

| | Percent |
|---|---|
| Magnesite | 25–97 |
| Chrome ore | 0–70 |
| Chrome salt | 0–3 |
| Lime | 0.5–3 |
| Magnesium sulfate | 1–5 |

The following examples are given to more clearly illustrate the character of the invention, but with no intention to be limited thereto.

*Example I*

A dry refractory mixture suitable for deposit on the walls of a furnace by gun application was made as follows.

A dead burned-magnesite showed the chemical analysis:

| | Percent |
|---|---|
| $SiO_2$ | 4.8 |
| $Fe_2O_3$ | 2.4 |
| $Al_2O_3$ | 1.3 |
| CaO | 4.0 |
| MgO | 87.4 |
| Ignition loss | 0.1 |

A refractory component was prepared containing about 60% by weight of coarse magnesite having particles of a size in the range of −6 +30 mesh, about 20% by weight of fine grind magnesite having particles of a size smaller than 8 mesh and about 22% thereof of a size smaller than 100 mesh, and about 20% by weight of pulverized magnesite having particles of a size smaller than 30 mesh, and about 70% thereof of a size smaller than 100 mesh.

To each 96 parts by weight of this magnesite material as added 2 parts by weight of hydrated lime and 2 parts by weight of Epsom salts ($MgSO_4 \cdot 7H_2O$).

At the time of passage through a BRI gun, the dry mixture was mixed with about 12.5% by weight of water.

The wetted mixture was propelled against the lining of a furnace to repair a slag line area. This lining at the time of application was at a temperature of about 2100° F. The slag line area patch was an adherent layer substantially free of cracks.

*Example II*

A gunning mix suitable for patching a furnace lining was prepared from the magnesite whose chemical analysis was substantially the same as that in Example I.

Forty parts by weight of particles of magnesite, 20 parts of which were of a particle size which passed a ⅛″ screen and were retained on a No. 16 screen and 20 parts of which passed through a No. 16 screen and were retained on a No. 30 screen, was mixed with 56 parts by weight of chrome ore, of the analysis shown hereinbefore when discussing chrome ore and having a particle size such that substantially 100% of the ore passed through a No. 30 U.S. Standard screen.

To 96.5 parts by weight of dry mixture was added 1.5 parts of hydrated lime and 3 parts by weight of Epsom salts.

The mixture was rendered uniform by tumbling in a revolving drum mixer. At the time of wetting in the BRI gun nozzle, an estimated approximately 14% by weight of water was added to the composition. The wetted mixture of composition was projected against the cold wall of a furnace. After drying for about 24 hours to a temperature of about 1200° F., the deposited gunning mixture was then set sufficiently for service.

*Example III*

A gunning mix suitable for patching a furnace lining was prepared from the magnesite whose chemical analysis was substantially the same as that in Example I.

Forty parts by weight of particles of magnesite, 20 parts of which were of a particle size which passed a ⅛″ screen and were retained on a No. 16 screen and 20 parts of which passed through a No. 16 screen and were retained on a No. 30 screen, was mixed with 56 parts by weight of chrome ore, of the analysis shown hereinbefore when discussing chrome ore.

To 96.5 parts by weight of dry mixture was added 1.5 parts of hydrated lime and 3 parts by weight of kieserite ($MgSO_4 \cdot H_2O$).

The mixture was rendered uniform by tumbling in a revolving drum mixer. At the time of wetting in the BRI gun nozzle, approximately 14% by weight of water was added to the composition. The wetted mixture of composition was emplaced on the hot bottom of a furnace. After drying for about 24 hours to a temperature of about 1200° F., the deposited gunning mixture was then set sufficiently for service.

Although we have described preferred embodiments of the invention in considerable detail, it will be understood that the description is intended to be illustrative rather than restrictive and that details may be modified or changed without departing from the spirit or the scope of the invention. Accordingly, we do not desire to be restricted to the exact compositions described.

I claim:

1. A refractory gunning composition consisting essentially of dead-burned magnesia, between 0.5% and 7% of lime, and between 1% and 5% of magnesium sulfate.

2. A refractory gunning composition which consists essentially of between 25% and 97% dead-burned magnesia, between 0% and 70% of chrome ore, between 0% and 3% chrome salt, between 0.5% and 7% of lime, and between 1% and 5% of magnesium sulfate.

3. A refractory gunning composition which consists essentially of between 25% and 70% by weight of comminuted dead-burned magnesite of a particle size such that the particles pass a ⅛ inch screen and a maximum of 40% passes a number 100 U.S. Standard screen, between 0% and 70% by weight of chrome ore of a particle size such that 100% passes a number 30 U.S. Standard screen, between 0.5% and 7% by weight of lime, and between 1% and 5% by weight of magnesium sulfate.

4. A refractory gunning composition which consists essentially of comminuted dead-burned magnesite, 2% by weight of hydrated lime, and 2% by weight of Epsom salts.

5. A refractory gunning composition which comprises by weight 40% of comminuted dead-burned magnesite, 55.5% of chrome ore, 1.5% of hydrated lime, and 3% of Epsom salts.

6. The method of improving water tolerance of refractory gunning compositions consisting essentially of comminuted dead-burned magnesite and between 1% and 5% of magnesium sulfate, said method consisting in intimately admixing with said composition between 0.5% and 7% of lime.

7. The method of making refractory repairs which comprises admixing dead-burned magnesia and between 1% and 5% of magnesium sulfate with between 0.5% and 7% of lime, mixing the dry solids with between 8% and 16% of water on a weight of the dry solids basis in a spray gun and discharging the wetted mix into contact with a base and drying the deposited wetted mixture.

8. The method of making refractory repairs which comprises admixing between 25% and 97% of magnesia, between 0% and 70% of chrome ore, between 0% and 3% of chrome salt, between 0.5% and 7% of lime, and between 1% and 5% of magnesium sulfate, mixing the dry solids with between 8% and 16% of water on a weight of the dry solids basis in a spray gun and discharging the wetted mix into contact with a base and drying the deposited wetted mixture.

9. The method of making refractory repairs which comprises admixing dead-burned magnesite and between 1% and 2.25% magnesium sulfate, and between 1.25% and 2.5% of hydrated lime, mixing the dry solids with between 8% and 16% of water on a weight of the dry solids basis in a spray gun and discharging the wetted mix into contact with a base and drying the deposited wetted mixture.

10. The method of making refractory repairs which comprises admixing comminuted dead-burned magnesite, 2% by weight of hydrated lime, and 2% by weight of Epsom salts, mixing the dry solids with between 8% and 16% of water on a weight of the dry solids basis in a spray gun and discharging the wetted mix into contact with a base and drying the deposited wetted mixture.

11. The method of making refractory repairs which comprises admixing by weight 40% of comminuted dead-burned magnesite, 55.5% of chrome ore, 1.5% of hydrated lime, and 3% of Epsom salts, mixing the dry solids with between 8% and 16% of water on a weight of the dry solids basis in a spray gun and discharging the wetted mix into contact with a base and drying the deposited wetted mixture.

References Cited by the Examiner

UNITED STATES PATENTS

| | | | |
|---|---|---|---|
| 1,212,575 | 1/1917 | Siegmann | 106—105 |
| 3,047,411 | 7/1962 | Chantler et al. | 106—58 |

TOBIAS E. LEVOW, *Primary Examiner.*